United States Patent

Asada et al.

[11] Patent Number: 5,854,148
[45] Date of Patent: Dec. 29, 1998

[54] OPTICALLY READABLE MARK RECORDED CLOTH AND A PRODUCTION PROCESS THEREOF

[75] Inventors: Hiroyoshi Asada, Kawasaki; Shiro Imai, Kyoto; Miyoshi Okamoto, Takatsuki, all of Japan

[73] Assignee: Toray Industries, Inc., Tokyo, Japan

[21] Appl. No.: 976,954

[22] PCT Filed: Aug. 12, 1991

[86] PCT No.: PCT/JP91/01073

§ 371 Date: Jun. 8, 1993

§ 102(e) Date: Jun. 8, 1993

[87] PCT Pub. No.: WO93/04230

PCT Pub. Date: Mar. 4, 1993

Related U.S. Application Data

[63] Continuation of Ser. No. 603,183, Feb. 20, 1996, abandoned, which is a continuation of Ser. No. 30,304, Jun. 8, 1993, abandoned.

[51] Int. Cl.⁶ ................... D0 11/00; B32B 3/00
[52] U.S. Cl. ............... 442/203; 442/2; 442/60; 442/189; 442/304; 442/325; 442/340; 428/220; 235/462; 235/494
[58] Field of Search ................ 442/60, 2, 325, 442/340, 189, 203, 304; 428/220; 235/462, 494

[56] References Cited

U.S. PATENT DOCUMENTS

| | | |
|---|---|---|
| 4,766,301 | 8/1988 | Evers . |
| 5,123,352 | 6/1992 | Luttrel ..................... 101/375 |

*Primary Examiner*—Richard Weisberger
*Attorney, Agent, or Firm*—Armstrong, Westerman, Hattori, McLeland & Naughton

[57] ABSTRACT

The object of the present invention is to provide optically readable mark recorded media, which can be permanently used to some extent with high durability against the mechanical forces applied by repeated washing, and can be read by optical readers accurately with few errors as essentially required for identification marks.

6 Claims, 1 Drawing Sheet

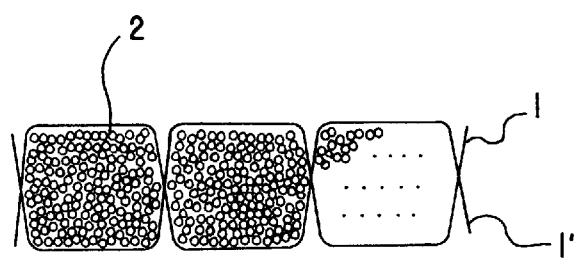
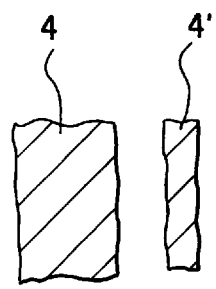
Fig.1(a) Fig.1(b)
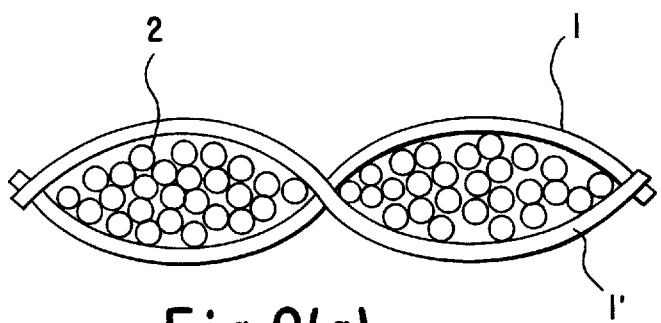
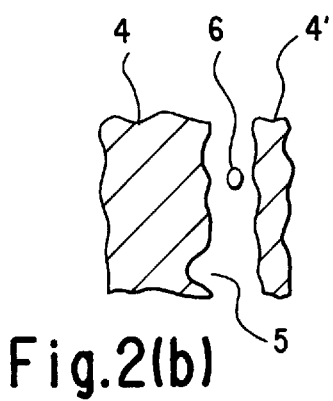
Fig.2(a) Fig.2(b)
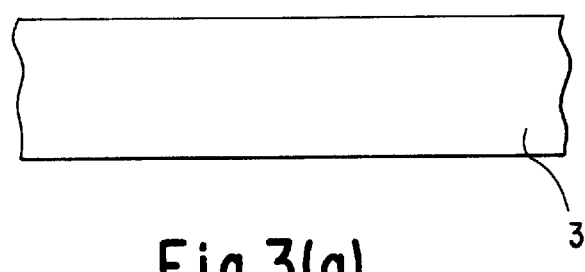
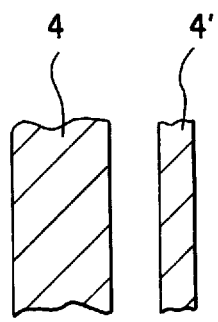
Fig.3(a) Fig.3(b)

OPTICALLY READABLE MARK RECORDED CLOTH AND A PRODUCTION PROCESS THEREOF

This application is a continuation of application Ser. No. 08/603,183 filed Feb. 20, 1996, now abandoned, which was a continuation of application Ser. No. 08/030,304 filed on Jun. 8, 1993, now abandoned, which was a 371 of PCT/JP91/01073 filed on Aug. 12, 1991.

TECHNICAL FIELD

The present invention relates to fiber cloth such as woven fabric, knitted fabric and nonwoven fabric, respectively with an identification mark optically readably recorded.

The information to be recorded as an identification mark in the present invention includes various data such as a maker name, commodity item code, processing method, washing method, handling method, size, color and date of manufacture respectively stated by the maker concerned, or such data as dealer code, price and other purchase data respectively stated by the dealer concerned, or identification data concerning customers, etc. Furthermore, other information useful for respective business areas can also be stated.

Moreover, the mark may represent the information to identify the owner, holder or depositee, etc. of the fiber cloth concerned or of the clothing, bedding or any other commodity to which the fiber cloth is attached by bonding or sewing, etc.

As can be seen from the above description, the optically readable identification mark in the present invention is typically a bar code, but is not limited thereto or thereby.

In the present invention, woven fabrics, knitted fabrics, nonwoven fabrics, etc. are generally called "fiber cloth". The present invention relates to fiber cloth with an optically readable mark recorded, with such features that the optically readable mark like a bar code can be accurately read without any error and that even if the fiber cloth is repeatedly subjected to washing and wearing, the mark can highly durably remain to allow reading and identification, without immediate loss of such capabilities. The present invention also relates to a production process thereof.

BACKGROUND

The distribution industry now resorting to the POS (point of sales) system widely uses bar code symbols for identifying individual articles.

For example, as dealers, bar codes are read to avoid the key entry into registers or to promptly identify sales tendencies for inventory control and sales results control, etc.

However, if identification bar codes are printed on fabrics, clothes, sewn products of beddings, etc., the conventional fiber cloth allows only deformed printing, unclear printing or printing low in optical density, to inconveniently lower the resolution for reading by bar code readers. Thus, the patterns obtained by printing bar codes on fiber cloth are apparently different from those obtained by printing on paper and films now mostly frequently used as optical recording media.

The reading accuracy and/or reading error rate of an optical reader significantly depends on the printing quality, and so, fiber cloth with any optically readable mark recorded has not yet been practically used because of such disadvantages as unclearness, low density and low resolution It is proposed to coat cloth with a polymer or to use a film, but these methods have a serious defect that the cloth becomes hard. Furthermore, generally fiber cloth is often washed 50 to 70 times, and the washing causes the coating to peel or leaves wrinkles, making the printed bar codes unreadable by bar code readers any more.

The conventional fiber cloth has such a disadvantage that the bar code cannot be clearly printed unlike paper and so cannot be instantaneously or accurately read by an optical reader.

Therefore, at present, bar codes are popularly used for printing on paper and films.

Thus, bar codes are now mainly used for disposable goods. For example, in the laundry industry, it is practised to use tags with identification bar codes for laundry name identification, customers control, laundry agents control, etc. Concretely it is practised that a laundry agent attaches a piece of paper with a bar code recorded to any part of every article submitted by a customer for cleaning, so that the article cleaned by the laundry located at any other place may be correctly returned to the laundry agent concerned. The piece of paper with a bar code recorded is used only once and torn away after one time of use, since the article to be cleaned does not have such paper attached originally and is not required. However, it is troublesome to attach a piece of paper with a bar code recorded whenever an article to be repeatedly cleaned is submitted to a laundry agent.

Therefore, if a piece of fiber cloth can be provided with a bar code which can be accurately read and endure frequent cleaning, then it is very useful.

If a piece of fiber cloth with a bar code recorded is attached at a proper place like a label, it is not necessary to attach a bar code recorded medium made of paper whenever the article is submitted for cleaning. Pieces of fiber cloth are softer to touch, more durable and stronger in cleaning and easier to be attached to clothes, etc. than pieces of paper and films.

Furthermore, as general practice in the respective steps of distribution, fabrics, clothes and sewn products of beddings, etc. have bar code labels attached to identify maker names, brands, material qualities, prices, etc., and the attaching work is also very troublesome. Also in this case, if bar code labels once attached can be used permanently to some extent, the troublesome work can be eliminated.

From this viewpoint, research has been conducted to practically print bar codes on fiber cloth.

For example, Japanese Utility Model Laid-Open No. 89-13575 proposes to constitute an optically readable mark pattern by sewing or embroidering a desired pattern readable by an optical reader using a thread with a color different from that of the fabric. However, in this method, since the pattern edge form is decided by the fineness (thickness) of the embroidery thread itself, the thread must be made smaller in diameter, and to realize it, a complicated apparatus must be used with a long time taken for making the fine thread. Furthermore, sewing or embroidering is disadvantageous in view of productivity. Moreover, this method can little provide a very fine pattern, to limit the volume of information which can be expressed as a mark.

Bar codes are generally used for control of large quantities of articles, and these areas are not prepared at all to accept any method of low productivity like embroidery.

If there are labels with identification bar codes recorded, which can be repeatedly used, they will be able to be used valuable in also other industries and areas. However, so far we did not have such identification bar code labels that can be repeatedly used, are high in legibility accuracy and low in reading error rate, and can contain a large volume of information.

DISCLOSURE OF THE INVENTION

The technical problem to be solved by the present invention is to realize a mark recorded medium which can be used permanently to some extent even if repeatedly used through cleaning or so frequently used as threatening to be "crumpled" and is good in productivity without slighting the intention to reduce the cost by using the mark.

The object of the present invention to overcome the above various problems is to provide optically readable mark recorded media with good printing quality which allow various identification codes to be clearly printed for use in respective industries, can be used very durably and allow accurate reading by optical readers without few errors.

The optically readable marks in the present invention refer to bar codes and other codes for OCR (optical character recognition), etc. which can be optically read by corresponding optional readers, and are not especially limited in standards.

The object of the present invention described above can be achieved by optically readable mark recorded cloth, comprising fiber cloth mainly composed of very fine fibers of 1 to 0.00001 denier and with an optically readably recorded identification mark.

In the optically readable mark recorded cloth of the present invention, the identification mark is preferably a bar code. A bar code has information recorded by thick black lines, thin black lines, white lines between them, etc. in a narrow range, and to make the code legible, it is especially important that the mark is good in clearness, resolution, etc. So, bar codes are very suitable for exhibiting the effect of the present invention.

In the present invention, since the fibers constituting the fiber cloth are sufficiently fine, the fiber cloth is uniform, flat and compact in the surface structure, and so, an identification mark can be printed clearly and can be accurately read by an optical reader.

Furthermore, if the cloth is pressed to be flattened on the surface, it becomes more uniform and flat in the surface structure, to be more suitable as identification mark recorded fiber cloth to be read by an optical recorder.

The present invention also provides the following process for preparing optically readable mark recorded cloth.

The process for preparing optically readable mark recorded cloth of the present invention comprises the step of printing an optically readable mark on the surface of fiber cloth mainly composed of very fine fibers of 1 to 0.00001 denier.

As another version, the process for preparing optically readable mark recorded cloth of the present invention comprises the steps of treating filter cloth mainly composed of very fine fibers of 1 to 0.00001 denier by water jet punching; and printing an optically readable mark on the surface of the fiber cloth.

As a further other version, the process for preparing optically readable mark recorded cloth of the present invention comprises the step of printing an optically readable mark by an ink jet method on the surface of fiber cloth mainly composed of very fine fibers of 1 to 0.00001 denier.

As a still further other version, the process for preparing optically readable mark recorded cloth of the present invention comprises the steps of printing an optically readable mark on the surface of fiber cloth mainly composed of very fine fibers of 1 to 0.00001 denier; and covering the portion printed with the optically readable mark, with a triazine derivative based resin and/or a melamine derivative based resin.

BRIEF DESCRIPTION OF THE DRAWINGS

FIG. 1(a) is an expanded schematic longitudinal sectional model view showing optically readable mark recorded cloth formed by a highly dense woven fabric composed of very fine fibers of 1 denier or less in single fiber fineness. A state that many very fine fibers are compactly assembled and that the surface of the woven fabric is very flat is shown as a model.

FIG. 2(a) is an expanded schematic longitudinal sectional model view showing a woven fabric made of ordinary thick fibers and low in density. A state that the surface of the fabric is very undulating is shown as a model.

FIG. 3 is an expanded schematic longitudinal sectional model view showing fine quality paper such as copy paper used for a copier or heat transfer paper used for a heat transfer printer. The surface is of course very smooth compared to fiber cloth.

FIGS. 1 to 3(b) are plan views showing the mark recorded portions of the fabric shown in FIGS. 1 to 3(a) respectively, as models.

THE BEST EMBODIMENT FOR EXECUTION OF THE INVENTION

The present invention is described below in detail.

In the optically readable mark recorded cloth of the present invention, the method for preparing fibers of 1 denier or less is not especially limited, and can be selected from conventional various very fine fiber production techniques. For example, composite fibers formed by two mutually arranged high polymers, which are generally called island-in-sea type composite fibers can be used to form the cloth, or furthermore composite fibers, in which the islands are furthermore formed by island-in-sea type composite fibers, can also be used. In this case, the sea component used may be able to be separated away by a solvent or decomposing agent, or may be splittable fibers consisting of two components. Moreover, the very fine fibers can also be prepared directly by spinning under appropriate conditions.

Several methods are already known to prepare such fibers of 1 to 0.00001 denier, and for example, the methods described in "Chemistry and Manufacturing Industry (in Japanese), vol. 36, P.521–523" (1983, issued by Japanese Chemistry Association) can be properly used in the present invention.

The very fine fibers of 1 to 0.00001 denier in the present invention are not limited to circle in cross sectional form, and can be of any form selected from triangle, square, ellipse, polygon, etc. Flat forms such as ellipse and rectangle as cross sectional forms are rather preferable under the same single fiber fineness since surface flatness can be improved.

A preferable fineness range of the very fine fibers is 0.5 to 0.001 denier in view of production convenience, cost and the intended effect of the present invention, and according to findings by the inventors, a more preferable range is 0.2 to 0.005 denier, the best range, being 0.1 to 0.01 denier.

The very fine fibers can be made of a polyester, polyamide, acrylate or polyphenylene sulfide, etc. Considering durability, and the printing method such as ink jet method, impact print method or heat transfer method as described later, polyester fibers, polyamide fibers and acrylic fibers are preferable. Above all, polyester fibers are especially preferable in view of high color fastness, dimensional stability, etc.

The optically readable mark recorded cloth of the present invention is only required to be fiber cloth which can be any of woven fabric, knitted fabric and nonwoven fabric. It is not hard or stiff unlike copy paper. However, any paper-like finished nonwoven fabric, woven fabric or knitted fabric can also be used if it is soft to some extent, not being hard or stiff.

The fabric can be prepared by any conventional method. In the case of woven fabric, the weave can be plain weave, twill weave, satin weave, or double weave or derivative weave of the foregoing. In the case of knitted fabric, the knit can be any of warp knit, weft knit, etc. Furthermore, a raised fabric can be included. In the case of nonwoven fabric, it can be prepared by general spun bond method, flash spinning method or melt blow spinning method, etc., and furthermore, a raised nonwoven fabric can also be used.

When the optically readable mark recorded cloth of the present invention is a woven or knitted fabric, the numbers of warp and weft threads, and the numbers and density of component fibers are essential factors to obtain the preferable effect of the present invention. The product of the numbers of the component fibers for warp and weft should be preferably 5,000,000 fibers/cm$^2$ or more, and the product of the numbers of warp and weft threads woven or knitted should be preferably 1,000 threads/cm$^2$ or more, more preferably 2,000 threads/cm$^2$ or more. Especially when these values are satisfied, the printing efficiency of a coloring agent on the woven or knitted fabric is very high, and a very practical optical density and clear pattern boundaries of the identification mark can be secured.

Similarly also in the case of nonwoven fabric, it is preferable to have a very compact and flat surface structure, and concretely, according to the findings by the inventors, a nonwoven fabric of 0.15 g/cm$^3$ or more in apparent density is preferable, though not limited to this range. If the apparent density is in this range, any ordinary spun bond nonwoven fabric, calendered short-fiber nonwoven fabric or nonwoven fabric treated by water jet punching can be favorably used. A nonwoven fabric with a very rugged surface formed by extreme embossing is suitable for the present invention.

The apparent density in the present invention is expressed by the following equation:

Apparent density (g/cm$^3$)=Unit weight (g/cm$^2$)/Thickness (cm)

The reason for the above is described below in detail in reference to drawings for a case of woven fabric.

FIG. 1(a) is an enlarged schematic longitudinal sectional model view showing optically readable mark recorded cloth formed by a high density woven fabric composed of very fine fibers of 1 denier or less in single fiber fineness in conformity with the present invention. It shows, as a model, a state that many very fine fibers are assembled and that the surface of the woven fabric is very flat.

FIG. 2(a) is an enlarged schematic longitudinal sectional model view showing a woven fabric using ordinary fibers thick in single fiber fineness and coarse in density not in conformity with the present invention. It shows, like a model, a state that the surface of the woven fabric is very rugged.

FIG. 3(a) is an enlarged schematic longitudinal sectional model view showing fine quality paper such as copy paper used for a copier or heat transfer paper used for a heat transfer printer. The surface is, of course, very smooth compared to fiber cloth.

FIGS. 1 to 3(b) are respectively model plan views of mark recorded portions.

In the drawings, symbol 1 denotes the warp of the woven fabric; 2, the weft; 3, fine quality paper; and 4, 4', colored portions.

As shown in FIG. 2(a), in the case of a woven fabric using fibers thick in single fiber fineness and coarse in density, the rugged surface produces voids 5 in the colored portions and spots 6 in the portions not to be colored, as shown in FIG. 2(b), not allowing optical reading.

On the other hand, the optically readable mark recorded cloth of the present invention using very fine fibers has a peculiar flat surface structure as shown in the model of FIG. 1(a), which is a smooth surface close to that of the generally often used fine quality paper as shown in FIG. 3, and almost satisfactory printing as shown in FIG. 1(b) can be achieved.

In addition, if paper is bent and creased by a force acting from outside, the print at the crease is liable to come off disadvantageously, and so paper cannot be said to be highly durable. However, the cloth composed of very fine fibers of the present invention is flexible and the individual fibers are colored, to form a mark. Therefore, the deterioration of printing quality by bending can be inhibited, and even if some fibers are damaged or removed, they less affect the entire mark, to ensure high durability.

If cloth is formed by using mainly very fine fibers of 1 to 0.00001 denier, the fibers are very compactly put together in a sectional structure showing little clearances. Furthermore, if the fiber cloth has a proper external pressure applied on the surface (for example by pressing), the very fine single fibers are arranged to be further flat and more compact, to make the surface structure of the fiber cloth flat and densely packed, and a coloring agent can be effectively transferred onto the surface. A pattern with a density and boundaries practically close to those of fine quality paper can be obtained.

To enhance the compactness, the woven or knitted fabric or nonwoven fabric as described above can be, for example, heat-shrunken if the fabric is composed of highly heat-shrinkable yarns, or treated by the liquid columnar flow jetted at a high pressure from pores, so-called water jet punching, or any chemical such as benzyl alcohol, phenolic acid or methylene chloride, or a combination of these methods. However, to make the cloth structure more compact is also an effective means. Especially water jet punching can make the cloth structure more compact and make at least some of very fine fibers intertwined each other structurally, for inhibiting the deformation of the fiber cloth, and therefore preferable for obtaining a fabric excellent in form stability. The fabric treated by water jet punching is less liable to be deformed in printed lines and remains clear for a long time, and since the fibers are single filaments, the fabric is advantageously less liable to be disordered in texture and selvedge, being preferable to achieve the intended object of the present invention.

Pressing the fiber cloth from top or from top and bottom is preferable since the surface can be made flatter, as described before. The pressing can be effected, for example, using an iron or a calendar roll machine, etc. For effective pressing, it is also preferable to heat the fiber cloth to a temperature lower than the melting point of the cloth material. For example, if the material is polyester fibers, it is preferable to treat at a temperature lower than 200° C.

As described above, the present invention has been completed based on the new finding that fiber cloth sufficiently small in the fineness of its member fibers, and high in density and compactness is, preferably if pressed on the surface, uniform in surface structure, very flat and very compact, being optimum as fiber cloth for recording optically readable marks.

Thus, the optically readable mark recorded cloth of the present invention is high in density and very effective in directly obtaining a pattern clear at edges, like fine quality paper and films popularly used as conventional optical recording media, and is also very excellent in durability. Furthermore, since the fiber cloth mainly composed of very fine fibers is very soft, it can be applied not only to personal belongings but also to general clothes, etc., to greatly affect future living culture and clothing culture.

The optically readable mark recorded cloth of the present invention can be applied to various identification mark recording methods such as electrophotography, heat transfer method, ink jet method, electrostatic method, impact method, etc. respectively using any printer, and also use of various stamps and plates, with far more excellent printing quality achieved compared to ordinary fiber cloth.

The cloth of the present invention can any integral part of clothes, beddings and various other fiber products, or be attached as identification mark labels.

If any transfer agent or ink resistant against processing is used, the optically readable mark recorded cloth can be repeatedly used for a long time through processing. For example, even if it is used for clothes and beddings as labels for customers control and laundry agents control in the laundry industry, it will certainly bring about a revolution in the control system. Especially, recording by ink jet printing can be preferably used.

The reason why ink jet printing can be preferably used for recording is that if a dye is used as the ink, the ink is deposited on the surfaces of fibers and additionally inside the fibers by way of dyeing for printing the intended mark. Thus, a very durable mark can be easily printed. If the ink jet printing is used, it is preferable to pretreat the cloth using a size containing a metal salt for preventing the spreading of the ink.

The above mentioned resistance against processing refers the property that the optically readable mark recorded cloth is not deteriorated or not discolored so much as to make illegible even if it is bleached, dried, etc. in processing or placed in ordinary service environment such as wind, rain, water and rough handling.

If a fluorescent identification mark is formed, it can be recorded without being especially conscious of the color and pattern of the cloth or mark position, and so the applicable range will be able to be further expanded.

If higher heat resistance is required for repeated pressing at high temperatures as in the laundry industry, it is preferable to cover the surface of the very fine fibers in the portion with the optically readable mark printed, with a triazine derivative based resin and/or a melamine derivative based resin.

The triazine derivative based resin covering can be achieved, for example, by depositing an aqueous solution containing a triazine derivative compound described below and an inorganic acid or an organic acid or any of their salts, onto the cloth, and heat-treating the cloth in an atmosphere of 40% or more in relative humidity with at least 25% of water contained in the cloth.

The melamine derivative based resin covering can be achieved, for example, by depositing an aqueous solution containing a melamine derivative compound described below, an anionic surfactant and an acid catalyst, onto the cloth, and heat-treating in the presence of moisture.

The triazine derivative compound can be selected, for example, from those represented by the following general formula:

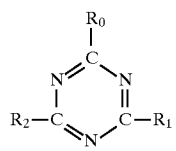

(where, $R_0$ to $R_2$: —H, —OH, —$C_6H_5$, —$C_{n_0}H_{2n_0+1}$ ($n_0$: 1 to 10), —$COOC_{n_1}H_{2n_1+1}$ ($n_1$: 1 to 20), —$CONR_3R_4$, —$NR_3R_4$, where, $R_3$, $R_4$: —H, —$OC_{n_3}H_{2n_3+1}$, —$CH_2OC_{n_3}H_{2n_3+1}$, —$CH_2COOC_{n_3}H_{2n_3+1}$ ($n_3$: 1 to 20), —$CH_2OH$, —$CH_2CH_2OH$, —$CONH_2$, —$CONHCH_2$ OH—O—(X—O)-$n_4R_5$ (X: $C_2H_4$, $C_3H_6$, $C_4H_8$, $n_4$: 1 to 1500), $R_5$: —H, —$CH_3$, —$C_2H_5$, —$C_3H_7$) Furthermore, it can be also selected from the ethyleneurea copolycondensation products, dimethylolurea polycondensation products, dimethylolthiourea copolycondensation products of the compounds represented by the above general formula.

The inorganic acid can be selected, for example, from sulfuric acid, hydrochloric acid, carbonic acid, phosphoric acid, etc. The organic acid can be selected, for example, from formic acid, acetic acid, acrylic acid, methacrylic acid, oxalic acid, malonic acid, succinic acid, malic acid, citric acid, tartaric acid, glutamic acid, aspartic acid, maleic acid, itaconic acid, methylfumaric acid, phthalic acid, isophthalic acid, etc.

The melamine derivative compound can be selected, for example, from those represented by the following general formula:

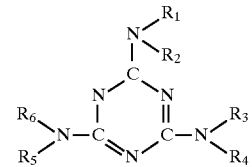

where, $R_1$ to $R_6$: —H, —OH, —$CH_2OCH_3$, —$CH_2OC_2H_5$, —$CH_2OH$, —$CH_2CH_2OH$, —$CH_2CH_2CH_2OH$.

The catalyst for resinifying the melamine derivative compound can be selected from the above mentioned inorganic acids, organic acids and their organic salts such as ammonium, sodium and potassium salts.

The anionic surfactant can be selected, for example, from carboxylic acid based anionic surfactants such as soap and sarcosinates, sulfate based aniline surfactants such as higher alcohol sulfates, sulfonated oils, sulfonated fatty acid esters and sulfonated olefins, sulfonate based anionic surfactants such as alkylnaphthalenesulfonates, Igepon T, Aerosol OT and ligninsulfonates, and phosphate based anionic surfactants such as higher alcohol phosphates. The anionic surfactant is not necessarily required for resinification, but if it is added to the aqueous solution, homogeneous resinification can be achieved preferably.

An aqueous solution containing any of the above triazine derivative compounds and melamine derivative compounds, and an acid, and preferably an anionic surfactant is deposited onto said cloth, by such a means as immersion, coating or spraying, etc. Said aqueous solution deposited is resinified by heat treatment, for obtaining the mark recorded cloth excellent in heat resistance of the present invention. If heat treatment is effected at 40% or higher RH at a temperature of 40° to 140° C. with water remaining in the cloth, an almost uniform film can be formed on the surface of the fibers preferably.

The optically readable mark recorded cloth of the present invention can be course be a large piece of cloth with a mark recorded in a small portion of it, or a narrow tape or label attached to any of clothes, sewn products of beddings, etc. or various commodities by any proper means such as fusion, sewing, etc.

For attaching by fusion, it is preferable that the optically readable mark recorded cloth of the present invention is thermally bonded, on the reverse side, for example, with a hot melt adhesive.

The prevent invention is described below in more detail in reference to examples.

EXAMPLE 1

Sea-island type composite fibers formed by two mutually arranged high polymers were used. In this case, the sea component was polystyrene and the island component was polyethylene terephthalate, and they were used at a ratio of islands/sea=90/10. Each yarn was 50 deniers in total and consisted of 9 filaments, each of which contained 70 island component fibers. The yarns were used as warp and weft yarns, to obtain machine-woven taffeta of 57 warp yarns/cm and 43 weft yarns/cm.

The taffeta was set by 180° C. dry heat, washed by trichloroethylene and dried, to obtain a woven very fine fiber fabric of 0.07 denier in single fiber fineness. The density of the fabric was 61 warp yarns/cm and 45 weft yarns/cm. Therefore, the product of the numbers of warp and weft yarns was more than 2,745 yarns/cm$^2$, and the product of constituting fibers was more than 1,089,490,500 fibers/cm$^2$.

The woven fabric was treated by using a size containing a metal salt, for preventing blurring, and had a JAN (Japanese Article Number) bar code in conformity with JIS printed by an ink jet printer using a dye. After completion of printing, the fabric was treated by steaming and washed, to obtain optically readable mark recorded cloth.

The printed bar code symbol was evaluated as to optical characteristics, and found to conform to JIS, and had no problem in the read inspection using a bar code symbol verifier, either.

EXAMPLE 2

The fiber cloth used in Example 1 was treated by water jet punching, and treated by a size containing a metal salt for prevention of blurring. It had an identification mark printed by an ink jet printer. The fabric had its fibers three-dimensionally intertwined and was less in flexibility, to effectively inhibit the deformation of the identification mark. It was more excellent in the durability of the identification mark than the product of Example 1.

The cloth with the identification mark printed had a saturated polyester based hot melt adhesive film thermally bonded on the reverse side. Then, it was cut into labels, and each label was thermally bonded to the back side of a lapel of a cook's coat, and hemmed by a sewing machine. The cook's coat was washed 70 times under the condition as adopted in the ordinary laundry industry.

After 70 times of washing, the bar code could be read by a multiscan type bar code reader without any problem.

EXAMPLE 3

Sea-island type composite fibers formed by two mutually arranged high polymers were used. In this case, the sea component was an alkali soluble polyester copolymer and the island component was polyethylene terephthalate, and they were used at a ratio of islands/sea=90/10, to spin yarns. Each yarn was 50 deniers in total and consisted of 10 filaments, each of which contained 70 island component fibers. The yarns were used as warp and weft yarns, to obtain machine-woven taffeta of 57 warp/cm and 43 weft yarns/cm.

Subsequently, the sea component was removed by dissolving, to obtain a very fine fiber cloth of 0.6 denier in single fiber fineness, with 61 warp yarns/cm and 45 weft yarns/cm, thus more than 2,745 yarns/cm$^2$ in the product of the numbers of yarns, and 1,345,000,000 fibers/cm$^2$ in the product of the numbers of constituting fibers.

The fabric was treated by water jet punching, to have its very fine fibers intertwined, thus being made more compact.

Subsequently the fabric had a JAN (Japanese Article Number) bar code in conformity with JIS printed using an ink jet printer, steamed and washed.

Then, the fabric was immersed in an aqueous solution containing 15% of methylated trimethylolmelamine, 1% of ammonium persulfate and dinaphthylmethanedisulfonic acid as a surfactant, to have 100 wt % (based on the weight of the fabric) deposited, and treated at 100% RH at 105° C. for 5 minutes for reaction. The fabric was further immersed in the same aqueous solution and treated for reaction again. The matter remaining unreactive was removed by soaping, and the fabric was dried, to obtain optically readable mark recorded cloth.

The printed bar code mark was evaluated as to optical characteristics and found to conform to JIS. In the inspection using a code mark verifier, it showed no problem.

To evaluate its heat resistance, it was washed at 50° C. and pressed at 190° C. for 30 seconds, and this operation was repeated several times.

The cloth could be still optically read, to show excellent heat resistance.

INDUSTRIAL APPLICABILITY

The optically readable mark recorded cloth of the present invention can bring about a large revolution in all the industries concerned with the distribution and handling of fiber-related articles.

For example, it can be effectively used for classification and sorting in the processing of cloth, and for recording of maker name, commodity item, pattern, size, washing method, dealer code, price, etc. for inventory control and sales control of clothes, beddings, etc., and also for customer control in the laundry industry and the high quality clothing industry.

The present invention can be very favorably applied to the control in the laundry industry, in which large quantities of many articles to be washed are to be collected by many laundry agents and transported to a laundry center and returned and distributed to the respective laundry agents.

The higher accuracy of control, automation, labor saving and higher efficiency which can be achieved by the present invention are very useful. The present invention can be applied not only to the control in the laundry industry, but also to delivery control, distribution control, storage control, classification or sorting control, etc.

We claim:

1. Optically readable mark printed cloth, comprising:
   woven or knitted cloth, wherein said woven or knitted cloth is comprised of very fine fibers of between 1 and 0.00001 denier, wherein a product of the number of warps and the number of wefts is at least 1,000 threads/cm$^2$ and a product of the number of warp fibers and the number of weft fibers is at least 5,000,000 fibers/cm$^2$; and an optically readable recorded identification mark on said cloth, wherein said cloth is a water jet punched and fibers of said cloth are three-dimensionally intertwined.

2. Optically readable mark recorded cloth, according to claim 1, wherein the identification mark is a bar code type symbol.

3. Optically readable mark recorded cloth according to claims 1 or 2, wherein the optically readable identification mark on the cloth is a printed optically readable identification mark.

4. Optically readable mark recorded cloth according to claim 3, wherein the optically readable identification mark is an ink jet type printed optically readable identification mark.

5. Optically readable mark recorded cloth according to claims 1 or 2, wherein at least the surface of very fine single fibers located at the optically readable mark is covered mainly with a resin.

6. Optically readable mark recorded cloth according to claims 1 or 2, wherein said cloth is hot-melt bondable to an article to be washed.

* * * * *